(12) United States Patent
Bleunven et al.

(10) Patent No.: US 7,769,650 B2
(45) Date of Patent: Aug. 3, 2010

(54) NETWORK-BASED SUB-ALLOCATION SYSTEMS AND METHODS FOR SWAPS

(75) Inventors: Daniel Bleunven, London (GB); Eliane Karotsch, London (GB); Christian Dalban, London (GB); Andrew D J Miller, Herts (GB)

(73) Assignee: JP Morgan Chase Bank, New York, NY (US)

( * ) Notice: Subject to any disclaimer, the term of this patent is extended or adjusted under 35 U.S.C. 154(b) by 1298 days.

(21) Appl. No.: 10/378,468

(22) Filed: Mar. 3, 2003

(65) Prior Publication Data

US 2004/0107157 A1    Jun. 3, 2004

Related U.S. Application Data

(60) Provisional application No. 60/430,449, filed on Dec. 3, 2002.

(51) Int. Cl.
G06Q 40/00    (2006.01)
(52) U.S. Cl. .......................... 705/35; 705/36 R
(58) Field of Classification Search .................. 705/35
See application file for complete search history.

(56) References Cited

U.S. PATENT DOCUMENTS

| | | |
|---|---|---|
| 3,653,480 A | 4/1972 | Yamamoto et al. |
| 4,205,780 A | 6/1980 | Burns |
| 4,264,808 A | 4/1981 | Owens et al. |
| 4,321,672 A | 3/1982 | Braun et al. |
| 4,355,372 A | 10/1982 | Goldberg et al. |
| 4,396,985 A | 8/1983 | Ohara |
| 4,495,018 A | 1/1985 | Vohrer |
| 4,617,457 A | 10/1986 | Myers et al. |
| 4,633,397 A | 12/1986 | Macco |
| 4,672,377 A | 6/1987 | Murphy |
| 4,694,397 A | 9/1987 | Vignola, Sr. et al. |
| 4,700,055 A | 10/1987 | Kashkashian, Jr. |
| 4,722,054 A | 1/1988 | Fukushima et al. |
| 4,745,468 A | 5/1988 | Von Kohorn |
| 4,752,877 A | 6/1988 | Roberts et al. |
| 4,774,664 A | 9/1988 | Gottardy et al. |

(Continued)

FOREIGN PATENT DOCUMENTS

EP    421808    4/1991

(Continued)

OTHER PUBLICATIONS

Delivering the Right Information to the Right Resource or Every Customer Interaction; Intelligent Callrouter, www.geotel.com/solutions/icr/default/htm, 1998, 1 Page.

(Continued)

Primary Examiner—James A Kramer
Assistant Examiner—James A Vezeris
(74) Attorney, Agent, or Firm—Lowenstein Sandler PC

(57) ABSTRACT

Network-based systems and methods for hosting and operating a network-based platform that allows clients to open and build a portfolio-swap account that is subdivided into a plurality of client sub-accounts or funds. The methods and systems of the invention allow the client to sub-allocate equity-swap transactions among its various client sub-account or funds as the client deems appropriate.

26 Claims, 9 Drawing Sheets

U.S. PATENT DOCUMENTS

| | | |
|---|---|---|
| 4,797,911 A | 1/1989 | Marks et al. |
| 4,797,913 A | 1/1989 | Kaplan |
| 4,799,156 A | 1/1989 | Shavit |
| 4,812,628 A | 3/1989 | Boston |
| 4,823,264 A | 4/1989 | Deming |
| 4,914,587 A | 4/1990 | Clouse |
| 4,926,255 A | 5/1990 | Von Kohorn |
| 4,931,793 A | 6/1990 | Fuhrmann et al. |
| 4,932,046 A | 6/1990 | Ross et al. |
| 4,948,174 A | 8/1990 | Thomson et al. |
| 4,972,504 A | 11/1990 | Daniel, Jr. |
| 4,974,878 A | 12/1990 | Josephson |
| 4,988,849 A | 1/1991 | Sasaki |
| 4,992,646 A | 2/1991 | Collin |
| 5,023,904 A | 6/1991 | Kaplan |
| 5,041,972 A | 8/1991 | Frost |
| 5,050,207 A | 9/1991 | Hitchcock |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,121,945 A | 6/1992 | Thomson et al. |
| 5,122,950 A | 6/1992 | Mee et al. |
| 5,136,502 A | 8/1992 | Van Remortel et al. |
| 5,157,717 A | 10/1992 | Hitchcock |
| 5,175,682 A | 12/1992 | Higashiyama |
| 5,179,584 A | 1/1993 | Tsumura |
| 5,187,750 A | 2/1993 | Behera |
| 5,198,975 A | 3/1993 | Baker et al. |
| 5,225,978 A | 7/1993 | Peterson |
| 5,237,159 A | 8/1993 | Stephens |
| 5,259,023 A | 11/1993 | Katz |
| 5,260,778 A | 11/1993 | Kauffman |
| 5,265,007 A | 11/1993 | Barnhard, Jr. et al. |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe et al. |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,367,581 A | 11/1994 | VanHorn et al. |
| 5,373,550 A | 12/1994 | Campbell |
| 5,383,113 A | 1/1995 | Knight |
| 5,396,417 A | 3/1995 | Burks |
| 5,402,474 A | 3/1995 | Miller |
| 5,412,190 A | 5/1995 | Kopesec et al. |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,490,060 A | 2/1996 | Malec |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,523,942 A | 6/1996 | Tyler et al. |
| 5,532,464 A | 7/1996 | Josephson et al. |
| 5,532,920 A | 7/1996 | Hartrick |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,555,299 A | 9/1996 | Maloney et al. |
| 5,557,515 A | 9/1996 | Abbruzzese et al. |
| 5,559,855 A | 9/1996 | Dowens et al. |
| 5,561,707 A | 10/1996 | Katz |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,592,377 A | 1/1997 | Lipkin |
| 5,592,378 A | 1/1997 | Cameron |
| 5,594,791 A | 1/1997 | Szlam et al. |
| 5,599,528 A | 2/1997 | Igaki |
| 5,603,025 A | 2/1997 | Tabb |
| 5,615,109 A | 3/1997 | Eder |
| 5,615,341 A | 3/1997 | Srikant et al. |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. |
| 5,679,938 A | 10/1997 | Templeton |
| 5,679,940 A | 10/1997 | Templeton |
| 5,684,863 A | 11/1997 | Katz |
| 5,687,250 A | 11/1997 | Curley et al. |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,450 A | 2/1998 | Ambrose |
| 5,717,989 A | 2/1998 | Tozzoli et al. |
| 5,724,424 A | 3/1998 | Gifford |
| 5,727,153 A | 3/1998 | Powell |
| 5,742,775 A | 4/1998 | King |
| 5,745,706 A | 4/1998 | Wolfberg et al. |
| 5,748,780 A | 5/1998 | Stolfo |
| 5,751,842 A | 5/1998 | Eccles et al. |
| 5,757,904 A | 5/1998 | Anderson |
| 5,757,917 A | 5/1998 | Rose et al. |
| 5,758,126 A | 5/1998 | Daniels et al. |
| 5,761,647 A | 6/1998 | Boushy |
| 5,765,142 A | 6/1998 | Allred et al. |
| 5,770,843 A | 6/1998 | Rose et al. |
| 5,774,553 A | 6/1998 | Rosen |
| 5,784,696 A | 7/1998 | Melnikoff |
| 5,787,403 A | 7/1998 | Randle |
| 5,793,846 A | 8/1998 | Katz |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,815,551 A | 9/1998 | Katz |
| 5,819,238 A | 10/1998 | Fernholz |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |

| | | | | | | |
|---|---|---|---|---|---|---|
| 5,832,464 A | 11/1998 | Houvener et al. | | 6,049,782 A | 4/2000 | Gottesman et al. |
| 5,832,488 A | 11/1998 | Eberhardt | | 6,052,674 A | 4/2000 | Zervides et al. |
| 5,835,580 A | 11/1998 | Fraser | | 6,055,510 A | 4/2000 | Henrick |
| 5,835,603 A | 11/1998 | Coutts | | 6,058,378 A | 5/2000 | Clark et al. |
| 5,835,899 A | 11/1998 | Rose et al. | | 6,058,380 A | 5/2000 | Anderson et al. |
| 5,842,211 A | 11/1998 | Horadan | | 6,058,381 A | 5/2000 | Nelson |
| 5,852,812 A | 12/1998 | Reeder | | 6,061,665 A | 5/2000 | Bahreman |
| 5,859,419 A | 1/1999 | Wynn | | 6,064,764 A | 5/2000 | Bhaskaran et al. |
| 5,862,223 A | 1/1999 | Walker | | 6,065,675 A | 5/2000 | Teicher |
| 5,864,609 A | 1/1999 | Cross et al. | | 6,067,524 A | 5/2000 | Byerly et al. |
| 5,870,456 A | 2/1999 | Rogers | | 6,070,147 A | 5/2000 | Harms et al. |
| 5,870,721 A | 2/1999 | Norris | | 6,070,150 A | 5/2000 | Remington et al. |
| 5,870,723 A | 2/1999 | Pare | | 6,070,798 A | 6/2000 | Nethery |
| 5,870,725 A | 2/1999 | Belinger et al. | | 6,073,104 A | 6/2000 | Field |
| 5,873,072 A | 2/1999 | Kight | | 6,073,113 A | 6/2000 | Guinan |
| 5,875,437 A | 2/1999 | Atkins | | 6,076,072 A | 6/2000 | Libman |
| 5,884,032 A | 3/1999 | Bateman | | 6,078,892 A | 6/2000 | Anderson et al. |
| 5,884,288 A | 3/1999 | Chang | | 6,078,907 A | 6/2000 | Lamm |
| 5,890,140 A | 3/1999 | Clark et al. | | 6,081,790 A | 6/2000 | Rosen |
| 5,897,625 A | 4/1999 | Gustin | | 6,085,168 A | 7/2000 | Mori et al. |
| 5,898,157 A | 4/1999 | Mangili et al. | | 6,088,683 A | 7/2000 | Jalili |
| 5,899,982 A | 5/1999 | Randle | | 6,088,685 A | 7/2000 | Kiron et al. |
| 5,903,881 A | 5/1999 | Schrader | | 6,088,686 A | 7/2000 | Walker et al. |
| 5,910,896 A | 6/1999 | Hahn-Carlson | | 6,092,056 A | 7/2000 | Tull, Jr. et al. |
| 5,910,988 A | 6/1999 | Ballard | | 6,098,052 A | 8/2000 | Kosiba et al. |
| 5,917,965 A | 6/1999 | Cahill et al. | | 6,098,053 A | 8/2000 | Slater |
| 5,920,847 A | 7/1999 | Kolling et al. | | 6,098,070 A | 8/2000 | Maxwell |
| 5,923,745 A | 7/1999 | Hurd | | 6,100,891 A | 8/2000 | Thorne |
| 5,930,778 A | 7/1999 | Geer | | 6,105,011 A | 8/2000 | Morrison, Jr. |
| 5,940,811 A | 8/1999 | Norris | | 6,108,639 A | 8/2000 | Walker et al. |
| 5,940,844 A | 8/1999 | Cahill et al. | | 6,110,044 A | 8/2000 | Stern |
| 5,943,656 A | 8/1999 | Crooks | | 6,111,858 A | 8/2000 | Greaves et al. |
| 5,945,653 A | 8/1999 | Walker et al. | | 6,115,690 A | 9/2000 | Wong |
| 5,950,175 A * | 9/1999 | Austin ................. 705/36 R | | 6,119,106 A | 9/2000 | Mersky et al. |
| 5,953,406 A | 9/1999 | LaRue et al. | | 6,119,107 A | 9/2000 | Polk |
| 5,956,700 A | 9/1999 | Landry | | 6,125,354 A | 9/2000 | MacFarlane et al. |
| 5,963,659 A | 10/1999 | Cahill et al. | | 6,128,602 A | 10/2000 | Northington et al. |
| 5,963,925 A | 10/1999 | Kolling et al. | | 6,128,603 A | 10/2000 | Dent et al. |
| 5,966,695 A | 10/1999 | Melchione et al. | | 6,129,273 A | 10/2000 | Shah |
| 5,966,698 A | 10/1999 | Pollin | | 6,138,118 A | 10/2000 | Koppstein et al. |
| 5,970,467 A | 10/1999 | Alavi | | 6,144,946 A | 11/2000 | Iwamura |
| 5,974,396 A | 10/1999 | Anderson | | 6,148,293 A | 11/2000 | King |
| 5,978,780 A | 11/1999 | Watson | | 6,149,056 A | 11/2000 | Stinson et al. |
| 5,987,435 A | 11/1999 | Weiss et al. | | 6,151,584 A | 11/2000 | Papierniak et al. |
| 5,987,436 A | 11/1999 | Halbrook | | 6,157,924 A | 12/2000 | Austin |
| 5,987,439 A | 11/1999 | Gustin et al. | | 6,173,272 B1 | 1/2001 | Thomas et al. |
| 5,991,750 A | 11/1999 | Watson | | 6,181,837 B1 | 1/2001 | Cahill et al. |
| 5,995,942 A | 11/1999 | Smith et al. | | 6,185,544 B1 | 2/2001 | Sakamoto et al. |
| 5,995,948 A | 11/1999 | Whitford | | 6,202,054 B1 | 3/2001 | Lawlor et al. |
| 6,000,832 A | 12/1999 | Franklin et al. | | 6,205,433 B1 | 3/2001 | Boesch et al. |
| 6,003,762 A | 12/1999 | Hayashida | | 6,212,178 B1 | 4/2001 | Beck et al. |
| 6,006,207 A | 12/1999 | Mumick et al. | | 6,226,623 B1 | 5/2001 | Schein et al. |
| 6,006,208 A | 12/1999 | Forst et al. | | 6,227,447 B1 | 5/2001 | Campisano |
| 6,009,442 A | 12/1999 | Chen et al. | | 6,230,287 B1 | 5/2001 | Pinard et al. |
| 6,014,636 A | 1/2000 | Reeder | | 6,233,332 B1 | 5/2001 | Anderson et al. |
| 6,016,344 A | 1/2000 | Katz | | 6,233,566 B1 | 5/2001 | Levine et al. |
| 6,016,482 A | 1/2000 | Molinari et al. | | 6,236,972 B1 | 5/2001 | Shkedy |
| 6,016,484 A | 1/2000 | Williams et al. | | 6,240,444 B1 | 5/2001 | Fin et al. |
| 6,018,722 A | 1/2000 | Ray et al. | | 6,269,361 B1 * | 7/2001 | Davis et al. ................. 707/3 |
| 6,026,370 A | 2/2000 | Jermyn | | 6,278,981 B1 | 8/2001 | Dembo et al. |
| 6,026,388 A | 2/2000 | Liddy et al. | | 6,289,322 B1 | 9/2001 | Kitchen et al. |
| 6,029,139 A | 2/2000 | Cunningham et al. | | 6,292,789 B1 | 9/2001 | Schutzer |
| 6,032,125 A | 2/2000 | Ando | | 6,301,379 B1 | 10/2001 | Thompson et al. |
| 6,032,133 A | 2/2000 | Hilt et al. | | 6,301,567 B1 | 10/2001 | Leong et al. |
| 6,032,137 A | 2/2000 | Hallard | | 6,304,653 B1 | 10/2001 | O'Neil et al. |
| 6,035,281 A | 3/2000 | Crosskey et al. | | 6,304,858 B1 | 10/2001 | Mosler et al. |
| 6,035,285 A | 3/2000 | Schlect et al. | | 6,321,212 B1 | 11/2001 | Lange |
| 6,035,287 A | 3/2000 | Stallaert et al. | | 6,324,524 B1 | 11/2001 | Lent et al. |
| 6,038,552 A | 3/2000 | Fleischl et al. | | 6,338,047 B1 | 1/2002 | Wallman |
| 6,038,553 A | 3/2000 | Hyde, Jr. | | 6,338,049 B1 | 1/2002 | Walker et al. |
| 6,041,312 A | 3/2000 | Bickerton et al. | | 6,374,235 B1 | 4/2002 | Chen et al. |
| 6,041,315 A | 3/2000 | Pollin | | 6,393,409 B2 | 5/2002 | Young et al. |
| 6,044,362 A | 3/2000 | Neely | | 6,405,173 B1 | 6/2002 | Honarvar et al. |

| | | |
|---|---|---|
| 6,405,179 B1 | 6/2002 | Rebane |
| 6,415,259 B1 | 7/2002 | Wolfinger et al. |
| 6,415,267 B1 | 7/2002 | Hagan |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,430,545 B1 | 8/2002 | Honarvar et al. |
| 6,446,072 B1 | 9/2002 | Schulze et al. |
| 6,456,983 B1 | 9/2002 | Keyes et al. |
| 6,480,850 B1 | 11/2002 | Veldhuisen |
| 6,490,568 B1 | 12/2002 | Omara et al. |
| 6,493,685 B1 | 12/2002 | Ensel et al. |
| 6,513,019 B2 | 1/2003 | Lewis |
| 6,535,896 B2 | 3/2003 | Britton et al. |
| 6,553,113 B1 | 4/2003 | Dhir et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,658,393 B1 | 12/2003 | Basch et al. |
| 6,704,714 B1 | 3/2004 | O'Leary et al. |
| 6,721,715 B2 | 4/2004 | Nemzow |
| 6,804,346 B1 | 10/2004 | Mewhinney |
| 6,825,940 B1 | 11/2004 | Wu et al. |
| 6,954,896 B1 | 10/2005 | Dodrill et al. |
| 6,970,259 B1 | 11/2005 | Lunt et al. |
| 7,062,456 B1 | 6/2006 | Riehl et al. |
| 7,104,443 B1 | 9/2006 | Paul et al. |
| 7,177,836 B1 | 2/2007 | German et al. |
| 2001/0018739 A1 | 8/2001 | Anderson et al. |
| 2001/0032139 A1 | 10/2001 | Debonnet, Jr. |
| 2001/0032158 A1 | 10/2001 | Starkman |
| 2001/0032159 A1 | 10/2001 | Starkman |
| 2001/0032176 A1 | 10/2001 | Starkman |
| 2001/0034682 A1 | 10/2001 | Knight et al. |
| 2001/0037309 A1 | 11/2001 | Vrain |
| 2001/0042034 A1 | 11/2001 | Elliott |
| 2001/0044293 A1 | 11/2001 | Morgan |
| 2001/0044771 A1 * | 11/2001 | Usher et al. .................. 705/37 |
| 2001/0047334 A1 | 11/2001 | Nappe et al. |
| 2001/0047489 A1 | 11/2001 | Ito et al. |
| 2002/0012445 A1 | 1/2002 | Perry |
| 2002/0013728 A1 | 1/2002 | Wilkman |
| 2002/0023055 A1 | 2/2002 | Antognini et al. |
| 2002/0026394 A1 | 2/2002 | Savage et al. |
| 2002/0038363 A1 | 3/2002 | MacLean |
| 2002/0052842 A1 | 5/2002 | Schuba et al. |
| 2002/0055907 A1 | 5/2002 | Pater et al. |
| 2002/0059141 A1 | 5/2002 | Davies et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0138398 A1 | 9/2002 | Kalin et al. |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0033212 A1 * | 2/2003 | Sandhu et al. ................ 705/26 |
| 2003/0037002 A1 | 2/2003 | Higgins et al. |
| 2003/0046218 A1 | 3/2003 | Albanese et al. |
| 2003/0097335 A1 | 5/2003 | Moskowitz et al. |
| 2003/0101119 A1 | 5/2003 | Persons et al. |
| 2003/0105641 A1 | 6/2003 | Lewis |
| 2003/0110442 A1 | 6/2003 | Battle |
| 2003/0120686 A1 | 6/2003 | Kim et al. |
| 2003/0163403 A1 | 8/2003 | Chen et al. |
| 2003/0187789 A1 | 10/2003 | Karas et al. |
| 2003/0191710 A1 | 10/2003 | Green et al. |
| 2003/0208421 A1 | 11/2003 | Vicknair et al. |
| 2003/0208441 A1 | 11/2003 | Poplawski et al. |
| 2003/0225663 A1 | 12/2003 | Horan et al. |
| 2003/0233305 A1 | 12/2003 | Solomon |
| 2003/0237046 A1 | 12/2003 | Parker et al. |
| 2004/0064409 A1 | 4/2004 | Kight et al. |
| 2004/0078328 A1 | 4/2004 | Talbert et al. |
| 2004/0201735 A1 | 10/2004 | Baron |
| 2004/0228514 A1 | 11/2004 | Houle et al. |
| 2005/0033690 A1 | 2/2005 | Antognini et al. |
| 2005/0177480 A1 | 8/2005 | Huang |

FOREIGN PATENT DOCUMENTS

| | | |
|---|---|---|
| EP | 1014318 | 6/2000 |
| JP | 7-152960 | 6/1995 |
| WO | 91/16691 | 10/1991 |
| WO | 93/08545 | 4/1993 |
| WO | 94/28497 | 12/1994 |
| WO | 96/08783 | 3/1996 |
| WO | 96/12242 A1 | 4/1996 |
| WO | 97/14108 | 4/1997 |
| WO | 97/45796 | 12/1997 |
| WO | 97/45814 | 12/1997 |
| WO | 98/09260 | 3/1998 |
| WO | 99/10823 | 3/1999 |
| WO | 00/39979 | 7/2000 |
| WO | 01/75730 A2 | 10/2001 |
| WO | 01/86524 | 11/2001 |
| WO | 02/063432 A2 | 8/2002 |
| WO | 2004/079603 | 9/2004 |

OTHER PUBLICATIONS

Computer Telephony Solutions; The Customer Interaction Specialists, Computer Telephony Solutions, Internet, May 25, 1999.
Anonymous; Visa & Carnegie Mellon Plan Online Payment Scheme, Newsbyte News Network, Feb. 15, 1995.
Goode; On Profit, Loss and the Mysteries of the Mind, The New York Times, Nov. 5, 2002.
Fidelity Helps Fund Sellers Trim the Taxes They'll Owe, The Wall Street Journal, Nov. 7, 2002.
Zuckerman; The Hedge-Fund Craze, The Wall Street Journal, Jun. 12, 2002.
Harsh Truth: Your Investments Likely Won't Make Any Money. McDonald; The Stars in the Sky Flicker, and Fund Stars Do the Same, The Wall Street Journal, Jan. 15, 2003.
Maher and Troutman; Provider's Prescription for Painless Migration to Receipt of Electronic Healthcare Payments and Remittance Advices, PNC Bank, Dec. 2001.
Maher and Troutman; Payor's Prescription for Painless Migration to Electronic Healthcare Payments and Remittance Advices, PNC Bank, Dec. 2001.
CES/Nabanco Introduces Stored Value Card Technology Blockbuster Video is First Merchant Partner, Business Wire, Inc., Jan. 15, 1996.
First Data Markets Stored-Value Cards, Cards International, Jan. 30, 1996, p. 5.
Norris; First Data Unit Develops Blockbuster Cash Card, Omaha World Hearld Sunrise Edition, Business Section, Jan. 19, 1996, p. 16.
Blockbuster Running Test of a Stored Value Card, The American Banker, Sep. 1, 1995.
Financial News; Wells Fargo Rolls Out Nationwide Lockbox Check Conversion, PR Newswire Association, Apr. 22, 2003.
Malhotra; Clearing House Enumerates E-Payments Ills, The American Banker, vol. 167, No. 154, Aug. 23, 2002.

Card Flash Daily Payment Card News, www.cardweb.com, Printed Sep. 23, 2004.

Nokia Announces the World's First NFC Enabled Mobile Product for Contactless Payment and Ticketing, PRnewswire, Feb. 9, 2005.

Annual Report Pursuant to Sectin 13 or 15(D) of the Securities Exchange Act of 1934, Form 10-K, Intelidata Technologies Corporation, Fiscal Year Ended Dec. 31, 2001.

Technology, in Brief Wachovia-Intelidata Deal, May 7, 2002.

French; Tech Stocks: Market Movers, Investors Worry Checkfree Being Chased From its Own Game, http://www.thestreet.com, Jun. 20, 2002.

Money, Initial Launch to 200 Credit Unions, USA_today.com, Jun. 27, 2002.

Bills; Chase Pact Done, What's Next for Web Vendors?, The American Banker, Technology Section, Jun. 3, 2002, p. 23.

Anonymous; Chase Manhattan Introduces New FEDI Payables Product, Proquest Document ID: 7806951, ISSN/ISBN: 02686635, May 1995.

Marjanovic; Corporate Services: Chase Gears Up Global Payments System Series: 16, The American Banker, vol. 160, Issue 174, Sep. 11, 1995, p. 41.

Anonymous; Operating in a Multi-Currency Environment, Proquest Document ID 9215937, ISSN/ISBN 09589309, Oct. 1995.

Reinbach; Chase Steps Up Treasury System, Proquest Documednt ID 8723558, ISSN/ISBN: 10459472, Nov. 1995.

Anonymous; Chasing the Global Trend, Cash Management News, Proquest Document ID 9319923, ISSN/ISBN: 02686635, Dec. 1995.

Gluck; Creating a Global Cash-Management Game Plan, Bank Systems & Technology, Feb. 1997, p. 28.

Anonymous; Systems Spell Change for Foreign Exchange, Global Investor, Proquest Document ID 1056152B, ISSN/ISBN: 09513604, Nov. 1996.

Decovny; Net Scope, Banking Technology, May 1997.

Press Release, Mar. 5, 2004, Payment Data Systems Files Patent on Debit Card Payment Solution, American City Business Journals, Inc., Mar. 5, 2004.

Global Corruption Report 2004, Transparency International, Pluto Press, www.globalcorrupt, ISBN 07453 2231, Jun. 26, 2005.

Lamond; Credit Card Transactions Real World and Online, Paying by Credit Card-Real World and Online, http://www.virtualschool.edu/mon/electronicproperty/klamond/credit, Printed Jul. 8, 2005, 17 Pages.

Carreker; Electronic Check Presentment: Capturing New Technology, http:proquest.umi.com, Banking Management, Rolling Meadows: vol. 71, Issue 2, Mar./Apr. 1995, p. 32, 5 Pages.

Lamond, Keith; Credit Card Transactions Real World and Online, http://www.virtualschool.edu/mon/electronicproperty/klamond/credit_card.htm, pp. 1-17, Printed Jul. 8, 2005.

Du Pont's Electronic Payments, Corporate EFT Report, V9, N1, Dialog File 636, Accession No. 01066902, Jan. 11, 1989.

Keep the Change Savings Service, Bank of America, Retrieved From the Internet on Jan. 27, 2006 At <https://www.bankofamerica.com/deposits/checksave/apps/ktc/ktc_terms.cfm>.

Dialog File 20, #10279554; Offer: Book Yourself Free Cassettes; Mar. 25, 2000; Birmingham Post, p. 16.

Rial, Astrid; How to Monitor Collectors, Credit Card Management, Jul. 2000, vol. 13, ISS. 3: p. 65, 4 Pages.

Terrie Miller and Henry Yan; When Custody Governs, Benefits Canada, Toronto, Feb. 1998, vol. 22, Issue 2, p. 33, 5 Pages.

* cited by examiner

NETWORK-BASED SUB-ALLOCATION SYSTEMS AND METHODS FOR SWAPS

CROSS REFERENCE TO RELATED APPLICATIONS

This application claims the benefit of U.S. Provisional Application Ser. No. 60/430,449, filed on Dec. 3, 2003, which is incorporated by reference herein in its entirety.

1. FIELD

The invention relates to network-based systems and methods for hosting and operating a network-based platform that allows clients to open and build a portfolio-swap account comprising various client sub-accounts. The methods and systems of the invention allow the client to sub-allocate equity-swap transactions among its various client sub-accounts.

2. BACKGROUND

In general, a swap is an agreement to trade future cash flows based on the future value of one or more market variables. There are many variations and types of swaps. An equity swap is swap with payments on one or both sides linked to the performance of equities or an equity index. Equity swaps are useful to: (1) initiate and maintain cross-border equity exposures either in an index or a specific stock portfolio; (2) temporarily eliminate exposure to an equity portfolio without disturbing the underlying equity position; and (3) increase, reduce, or eliminate market exposure to a single issue or a narrow stock portfolio or obtain greater diversification for a limited period of time without disturbing an underlying position.

In a simple equity swap, one party contracts to pay the return or depreciation on shares of a financial instrument, such as a stock or a derivative. The block of shares is worth an amount based on the market rate, this is the principal of the equity swap. Since in an equity swap agreement, the parties do not exchange the principal, it is termed a notational principal. In return, the party on the other side of the equity swap agrees to pay a fixed or floating interest on the notational principal.

The first party (the "client") is generally an entity that desires to realize the gains associated with owning certain equities but either does not have or want to expend money to purchase the equities on the market. The second party (the "financier") is typically a larger institution having capital to purchase equities but desires to minimize the risk of owning the equities. In an equity swap, the financier is in a sense providing the capital for the client to realize the gains or losses of the equity. Hence, the terms "financier" and "client" are used herein to make clearer the respective positions of the parties.

In an equity-swap sell transaction, the first party agrees to pay the stock's depreciation, while the second party agrees to pay interest on the notational principal at a particular interest rate and also pay to the first party any stock appreciation.

In an equity-swap buy transaction, the first party agrees to pay stock appreciation. In return, the second party agrees to pay interest on the notational principal and stock depreciation.

For example, say that a financial institution owns $100,000 shares of stock X. Through financial forecasting, the financial institution predicts that stock X will appreciate. The financial institution, however, wants to take on as little risk as possible. So to hedge against possible losses, the financial institution enters into an equity swap as follows. First, the financial institution sells the 100,000 shares of stock X at $10.00/share on the open market collecting $1,000,000.00 in cash and invests the $1,000,000.00 at the London Interbank Offered Rate (LIBOR) of interest. At the same time, the financial institution enters into a sell equity swap with a mutual fund in connection with 100,000 shares of stock X. The financial institution agrees to pay the mutual fund: (1) some interest rate less than LIBOR on a $1,000,000.00 notational principal; and (2) depreciation on the 100,000 shares of stock X's market value. In return, the mutual fund agrees to pay: (1) appreciation of stock X; and (2) a flat fee. Thus, the financial institution has hedged its original sale of stock X on the open market to the extent of the interest rate differences and the flat fee. And, if as the financial institution predicted, the stock appreciates, the financial institution will realize a gain greater than if it would have kept the stock and realized the market-rate appreciation. The mutual fund, perhaps predicting depreciation, benefits because it does not have to expend the capital required to transact a short sale on the market. The mutual fund has also hedged itself against appreciation of the stock in the event that it was wrong in its prediction that the stock would depreciate.

Following the facts above, but the financial institution anticipates a fall in stock X's share price, the financial institution could hedge against the risk associated with owning 100,000 shares by entering into a buy equity swap with the mutual fund. In the buy swap, the bank agrees to pay the mutual fund appreciation on the 100,000 shares of stock X. In return, the mutual fund agrees to pay the financial institution: (1) a flat fee; (2) depreciation of stock X; and (3) interest on a notational principal of $1,000,000.00 at the LIBOR rate. If the stock appreciates, the bank is hedged to the extent of the interest rate and the flat fee. On the other hand, if the stock depreciates the bank gains are greater than if it simply sold the stock short on the open market. The mutual fund benefits because it does not have to expend $1,000,000.00 of its own money to purchase 100,000 shares of stock X.

Mutual fund institutions typically have a large number of different funds each comprising financial instruments of varying risks, types, and maturity dates. Thus, the mutual fund managers can offer investors appropriate funds according to the individual investor's risk-management strategy. Accordingly, as the mutual fund enters into equity swap agreements with financial institutions, it must sub-allocate the equity swaps to various funds as appropriate. Typically, the mutual-fund manager provides the financial institution with instructions to sub-allocate the equity swaps among the mutual fund's various fund accounts. For example, these sub-allocation instructions might be in the form of a complicated spreadsheet faxed to the financial institution's appropriate department. Having to provide sub-allocation instructions in such a manner restricts control and flexibility of the fund manager. In order for the fund manager to make complicated sub-allocations, he must transmit increasingly complicated instructions. It follows that the greater the number of equity swaps, the less control and flexibility the fund manager has over sub-allocation. An even more tedious variation is that the fund manager sub-allocates by manually entering data into an in-house allocation platform. One can imagine the difficulty of instructing a financial institution to sub-allocate a 100 equity swaps per day to various funds according to percentages, dates, prices, number of shares, etc.

What are needed are network-based sub-allocation methods and systems that permit parties to an equity swap a high degree of flexibility and control to sub-allocate a large number of equity swaps into various accounts.

3. SUMMARY

The invention relates to network-based systems and methods for hosting and operating a network-based platform that allows clients to open and build a portfolio-swap account that is subdivided into a plurality of client sub-accounts or funds. A portfolio swap is a collection of individual swap transactions supporting multi-asset class underlyings. The methods and systems of the invention allow the client to sub-allocate equity-swap transactions among its various client sub-account or funds as the client deems appropriate. The methods and systems of the invention are particularly useful to mutual fund managers who must transact and sub-allocate large numbers of equity swaps among a plurality of funds.

Initially, the client and a third party, such as a financier, negotiate one or more equity swaps. Typically, the financier offers the client an opportunity to enter into a buy or a sell equity swap in connection with particular equities. Details, such as the trade date, share quantity, execution date, and trading currency are specified. Other details, such as notational principal are locked in upon settlement.

Thus, for example, the client submits to the financier a sell swap for 100,000 shares of stock X; the date of submission is the execution date. The settlement date occurs when the financier locks in the details, such as the notational principal based on stock X's real-time market price.

According to the invention, the equity swaps are recorded in a network-based swap-portfolio account opened for the client. The client structures various client sub-accounts within the swap-portfolio account among which equity swaps or any portion of the swaps can be allocated. The methods and systems of the invention provide great flexibility in that they allow the client to conveniently partition equity swaps among client sub-accounts in a variety of ways, for example, by number of shares or as percentages. Even more, the methods and systems of the invention allow the client to select a plurality of equity swaps for simultaneous allocation. For instance, in an account of one hundred equity swaps, the client can select ten and allocate a percentage of each to a particular sub-account account conveniently over a network. Such sub-allocation would be extremely inconvenient using current methods.

4. BRIEF DESCRIPTION OF THE FIGURES

These and other features, aspects, and advantages of the present invention will become better understood with regard to the following description, examples, appended claims, and accompanying drawings where:

Figure 2A:
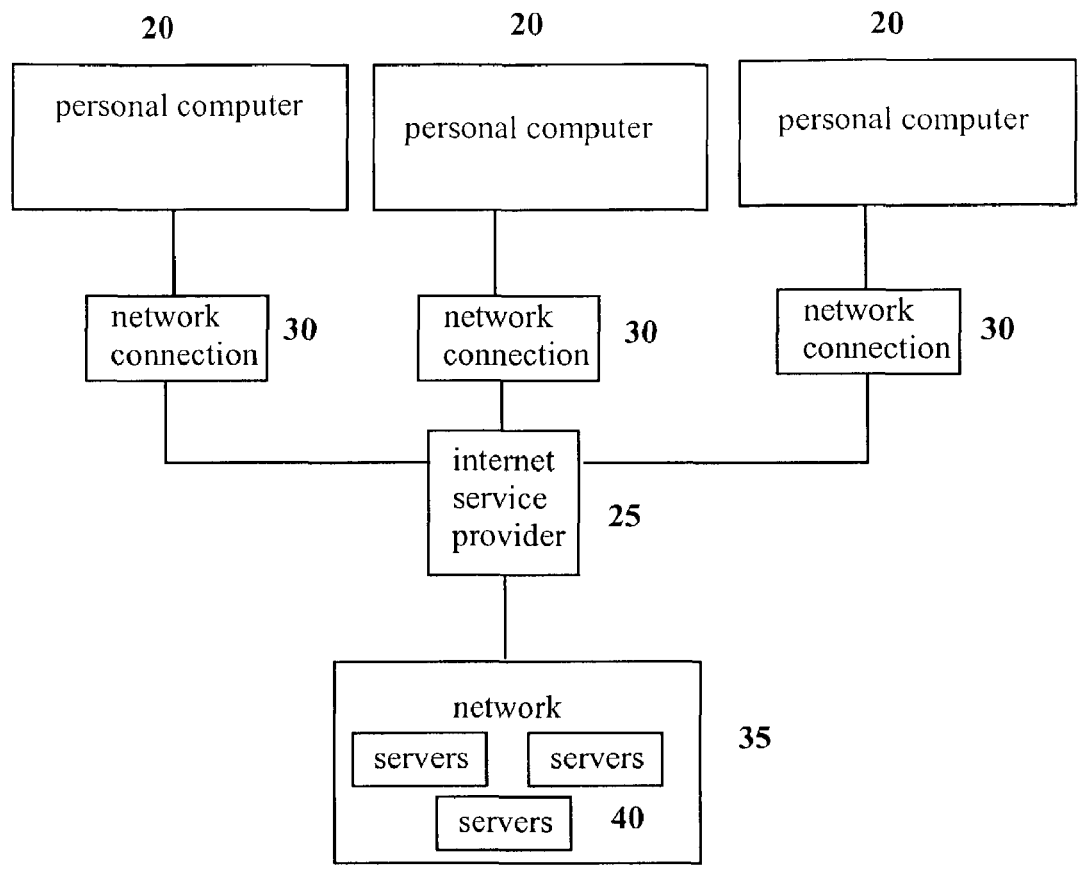
FIG. 2a is an illustration of a preferred network for use in the invention.
Figure 2B:
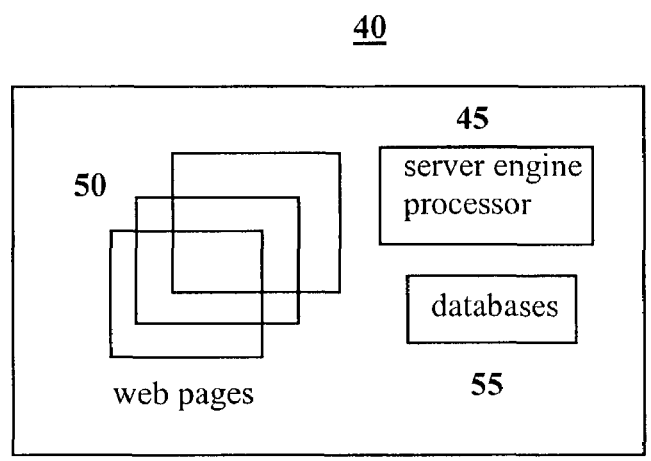
Figure 3:
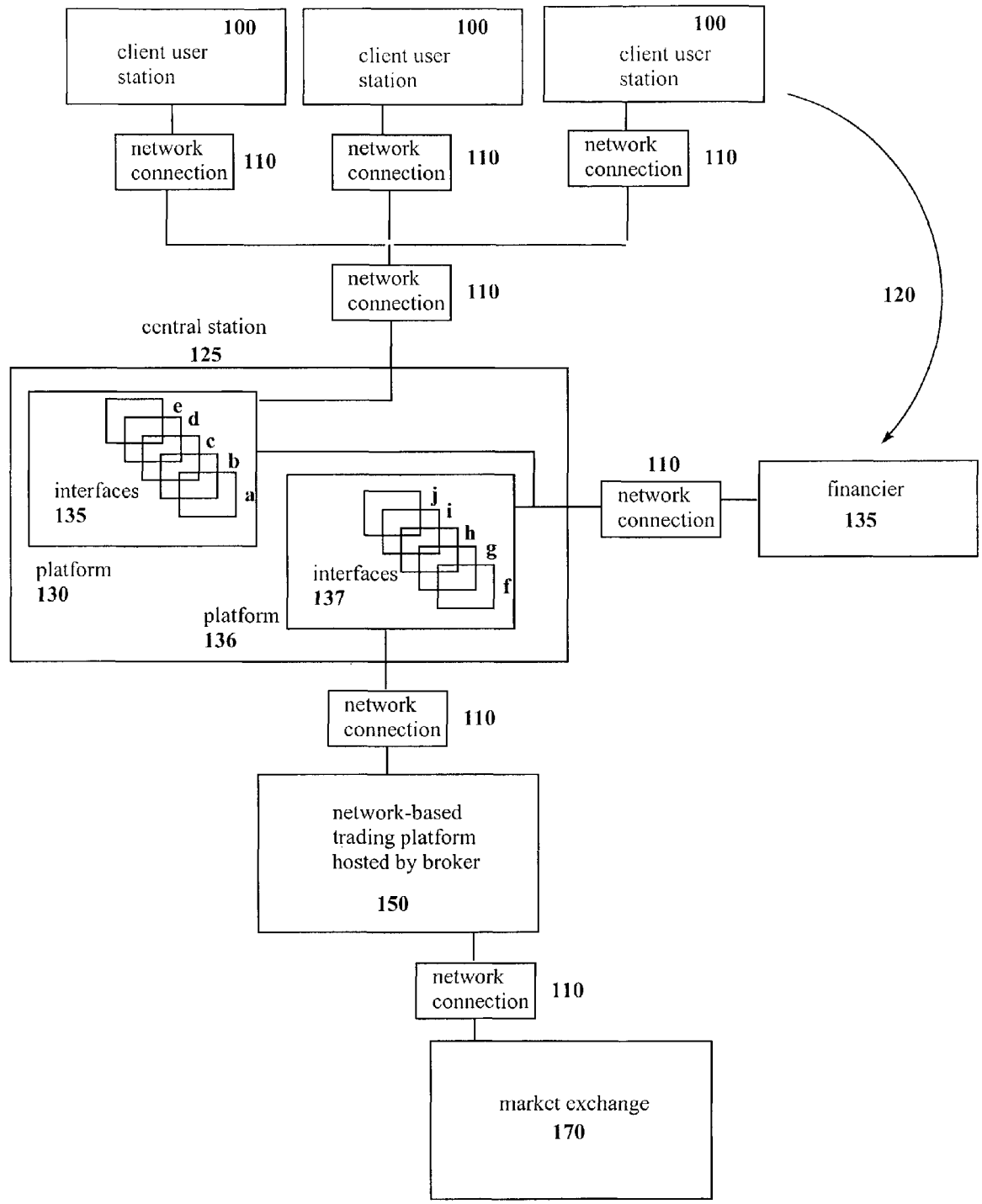
Figure 4:
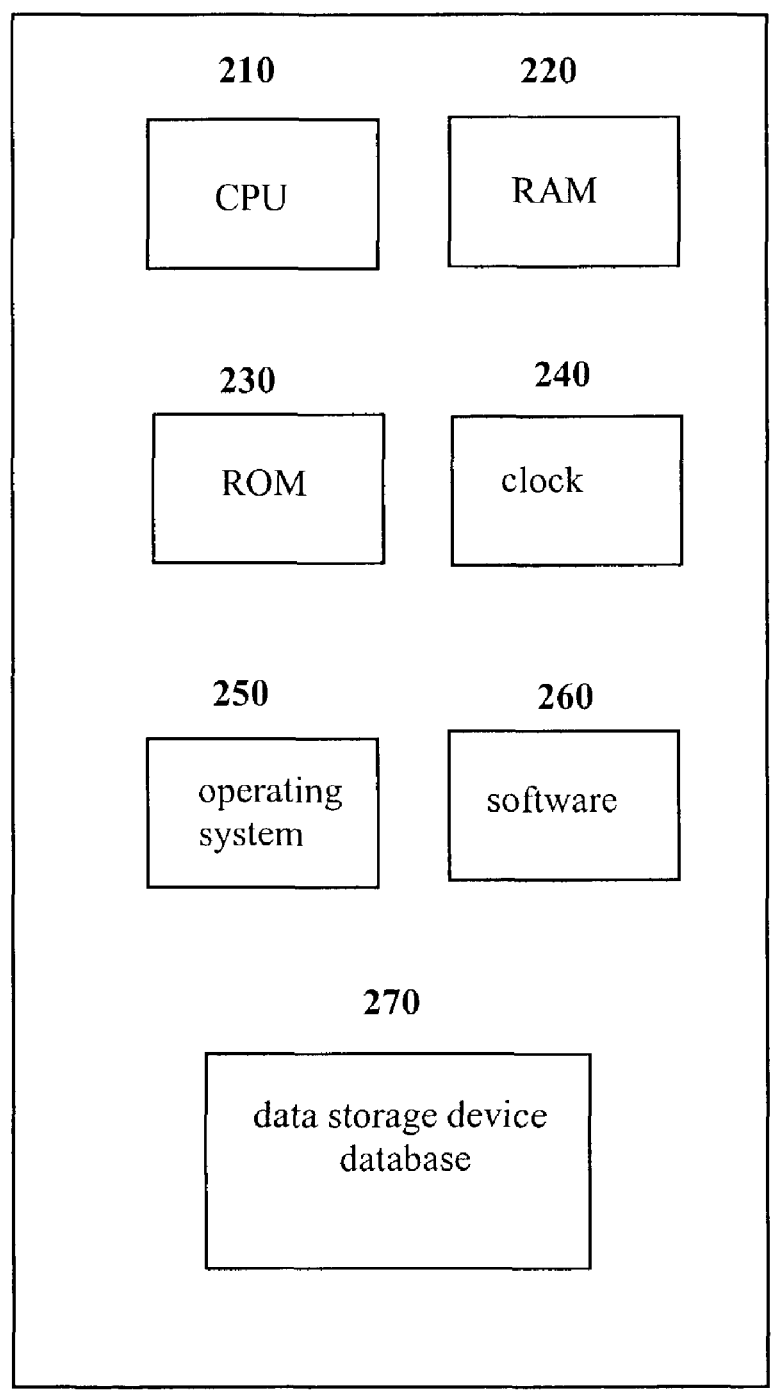
Figure 5:
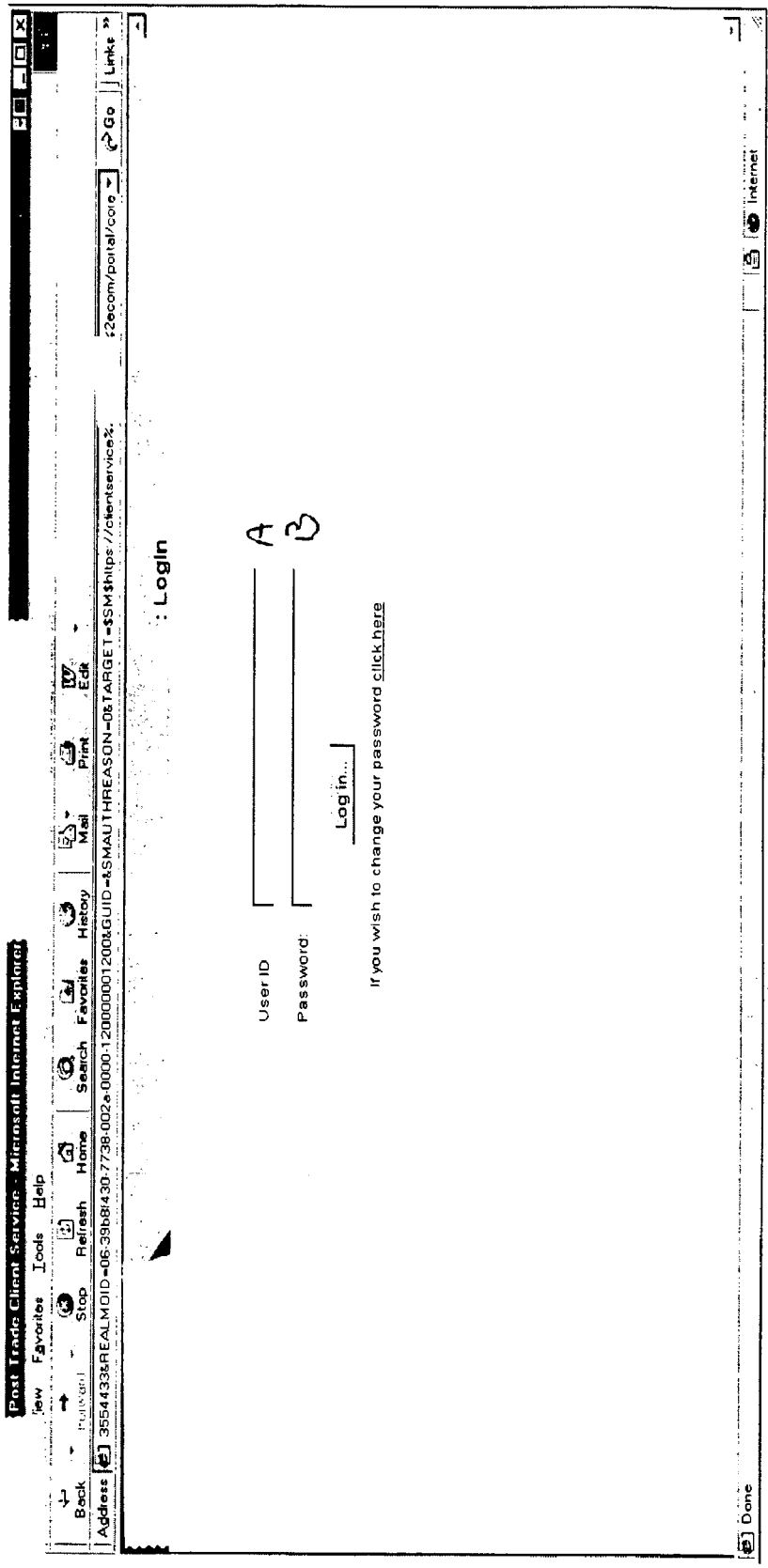
Figure 7:
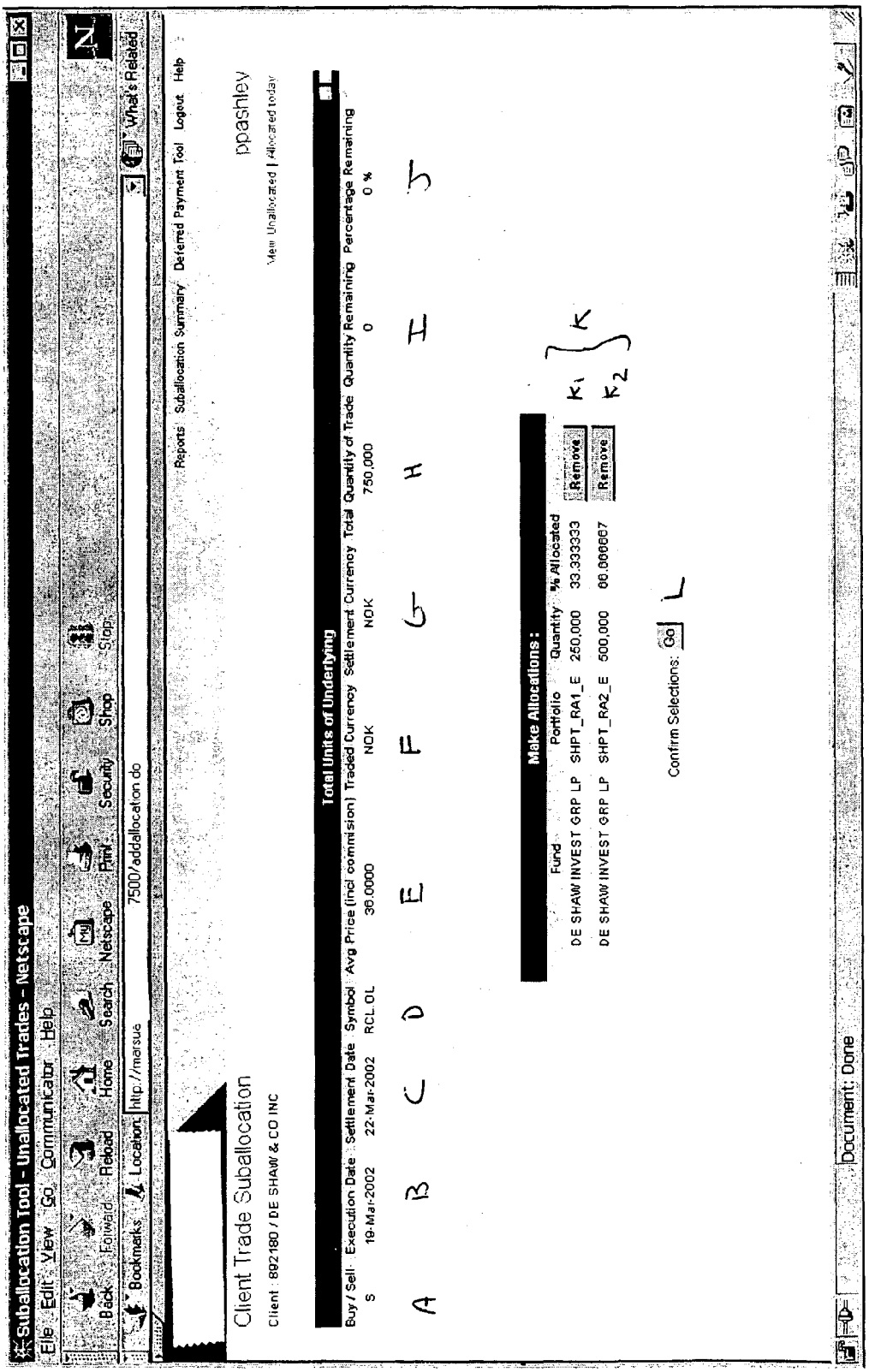
Figure 9:
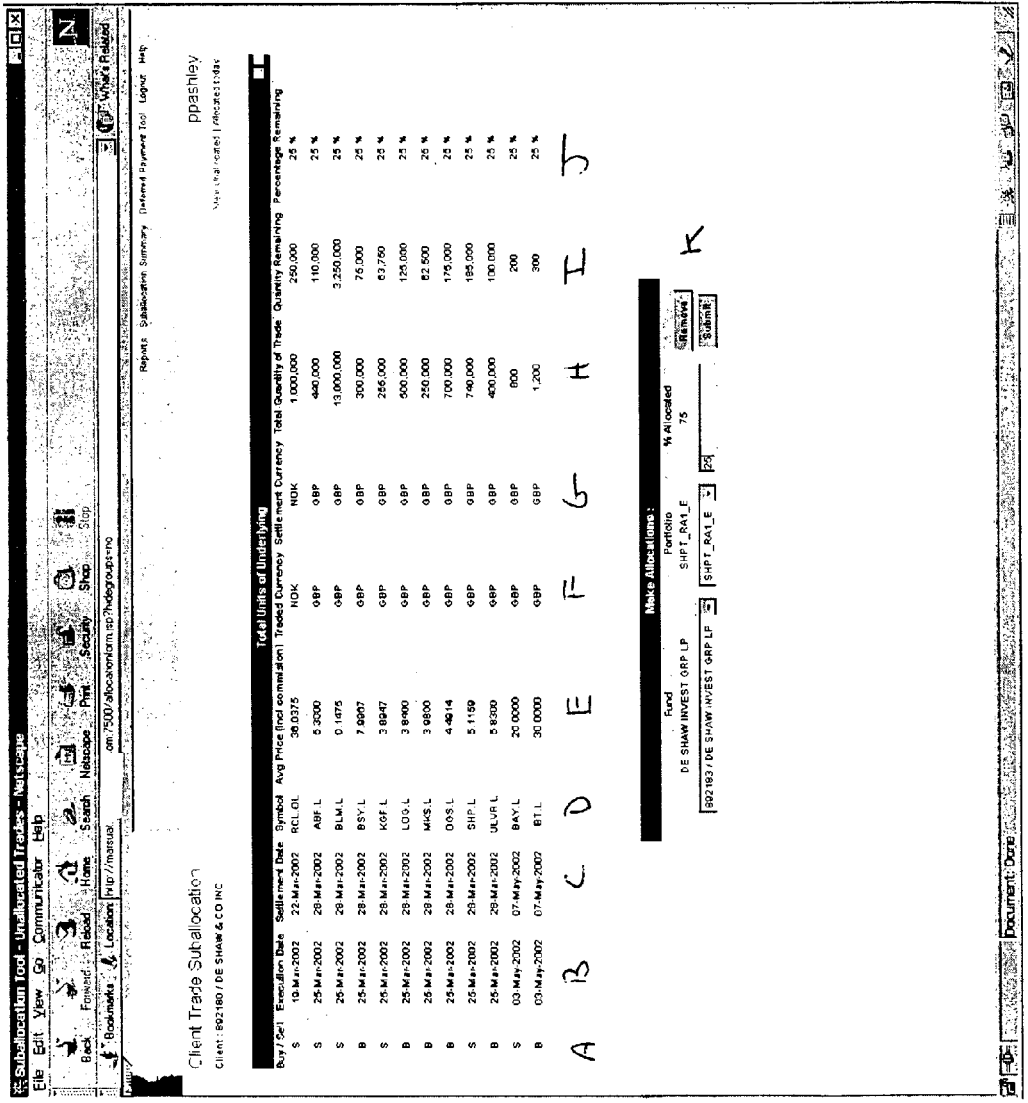

FIG. 2b provides the details of a typical platform for use in the invention;

FIG. 3 illustrates a preferred embodiment of the methods and systems of the invention;

FIG. 4 is a diagram of a central station for use in the invention;

FIG. 5 is a web-page screen shot exemplifying client logon;

Figure 6:
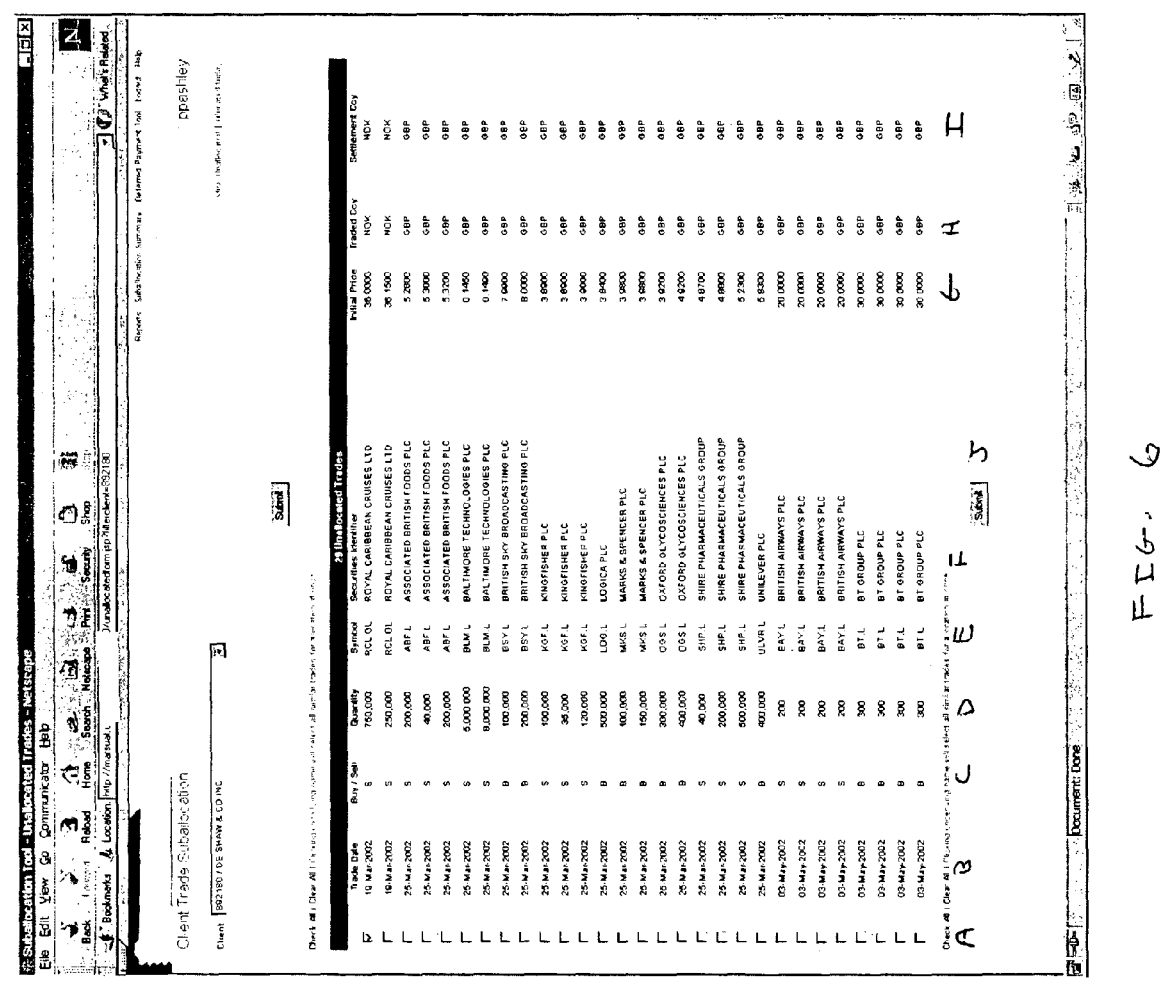

FIG. 6 is a web-page screen shot of a web page presented to the client by the platform after logon, which indicates unallocated swaps in a client's account;

FIG. 7 is a web-page screen shot providing an interface for the client to sub-allocate;

Figure 8:
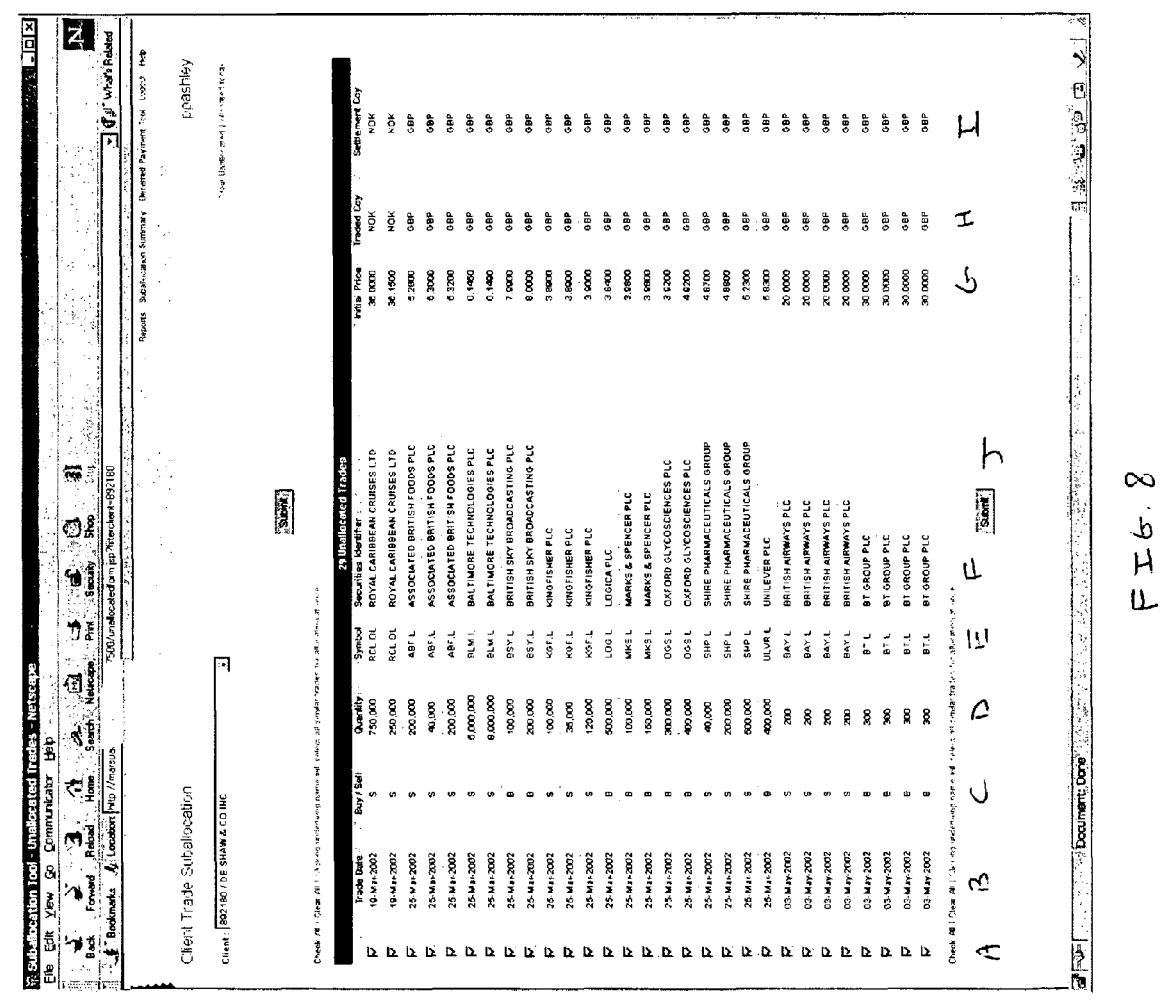

FIG. 8 is a web-page screen shot of a web page presented to the client by the platform after logon, which indicates unallocated swaps in a client's account; and FIG. 9 is a web-page screen shot where the client has chosen to sub-allocate a particular portion of unallocated swaps.

5. DETAILED DESCRIPTION

Figure 1:
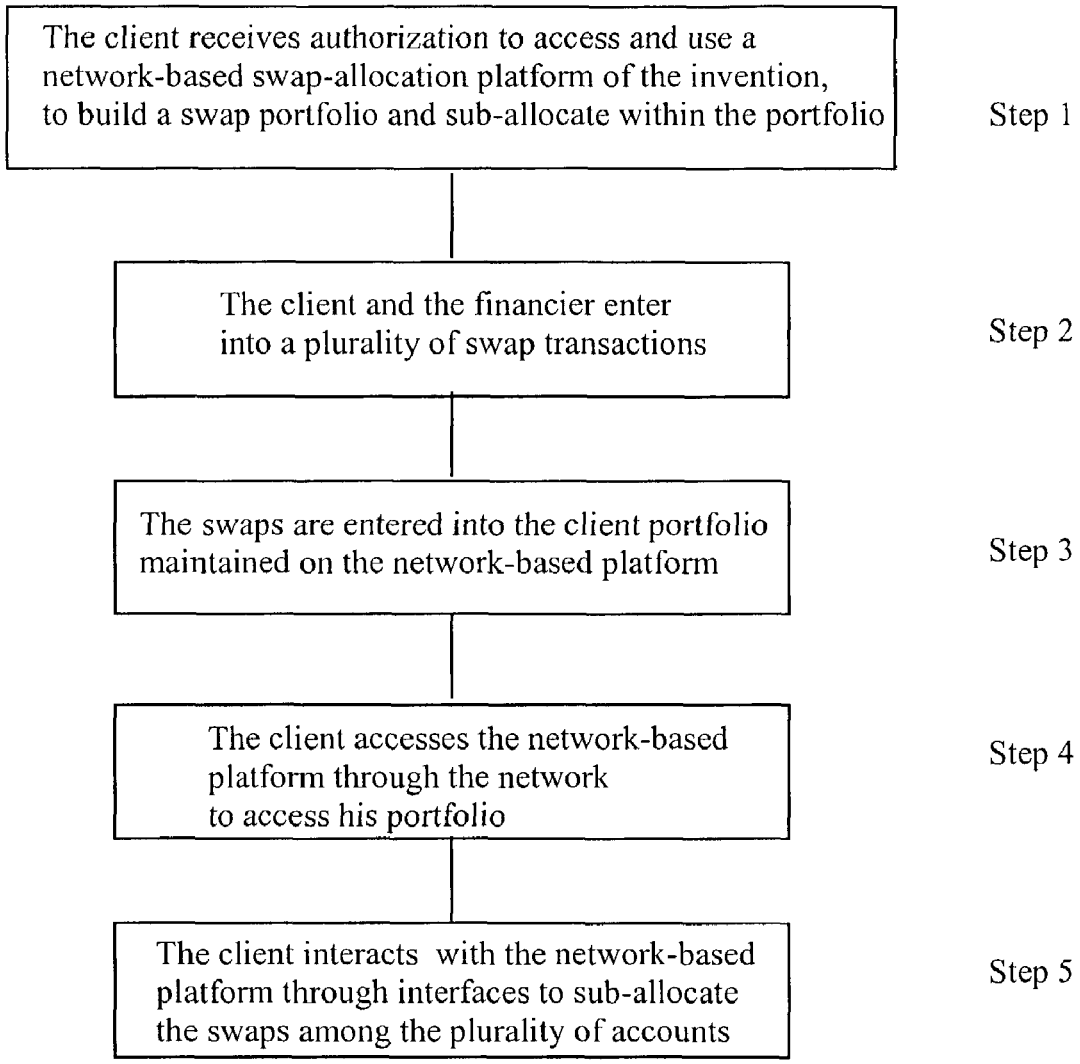
FIG. 1 is a flow chart outlining a primary embodiment of the invention.

FIG. 1 is a flow chart outlining a primary embodiment of the invention. In Step 1, the client receives authorization to access and use a network-based swap-allocation platform of the invention, to build a swap-portfolio account and sub-allocate within the various client sub-accounts that comprise the portfolio. Preferably, the network is the Internet and the platform is a network server. The network-based swap-allocation platform is operated by a third party, such as financial institution, financier, or an independent operator. The client's swap-portfolio account comprises a plurality of client sub-accounts among which the client allocates swaps. In Step 2, the client enters into one or more equity-swap transactions over a period. In Step 3, the equity swaps are recorded in the client's network-based swap-portfolio account. In Step 4, the client accesses the network-based platform through the network to access his swap-portfolio account. In Step 5, the client interacts with the network-based platform through the platform's interfaces (e.g., web pages) to sub-allocate the equity swaps among the client's plurality of accounts.

The systems and methods of the invention can be hosted on any network. A preferred network for use in the invention is illustrated in FIG. 2a. A plurality of personal computers 20, are connected to an Internet service provider (ISP) 25 via a network connections 30, such as a modem and dialup telephone line, a digital subscriber line ("DSL"), or a cable modem connection. Internet service provider 25 interfaces with network 35, which comprises a plurality of web content servers 40, including servers for control of domain-name resolution, routing, and other control functions.

The personal computers typically are configured with common Internet tools, including a web browser to access servers 40 and specialized programs to connect with certain services. These services include electronic mail, one-to-many messaging (bulletin board), on-line chat, file transfer, and browsing. Browsing is effected using the Hypertext Transfer Protocol (HTTP), which provides users access to multimedia files using Hypertext Markup Language (HTML). The entire system of personal computers, Internet service providers, and servers is called the Internet. The collection of servers 40 that use HTTP comprise the World Wide web, which is the Internet's multimedia information delivery system.

FIG. 2b provides the details of a typical platform 40 for use in the invention. Preferably the platform comprises a server engine 45, which receives HTTP requests to access the web pages 50 identified by Uniform Resource Locator ("URL") and provides the web pages as an interface to the requesting personal computer 20. The databases 55 contain various tables for storing information.

FIG. 3 illustrates an embodiment of the methods and systems of the invention. Network-based platform 130 (for example, an Internet server) located on central station 125 is provided, for example, by a financier, such as a financial institution or other financial-service provider. Platform 130 comprises interfaces 135 (for example web pages). The client first sets up a portfolio-swap account with the financier allowing the client to access and use platform 130 by way of user station 100.

Any conventional personal computer, computer workstation, or server with sufficient memory and processing capability may be used as central station 125. In one embodiment, central station 125 is a financial institution's central computer or network of computers. In another embodiment, central station 125 is an application service provider or a web server providing web pages. As is understood by those of skill in the art, an application service provider is an entity that offers individuals and enterprises access to applications and related services through the Internet (or other network) that would otherwise have to be located in local computers and/or devices.

The client can submit the equity-swap order by traditional means 120, such as telephone, mail, or e-mail. Alternatively, the methods and systems of the invention can be structured so that the client can directly submit equity-swap orders from station 100 through interfaces 135 of network-based platform 130. The client's equity swaps are entered into a database 270 (FIG. 4) located in central station 125 (the client's swap-portfolio account). The equity swaps can be entered into database 270 by the financier manually, for example, by keyboard. Alternatively, the methods and systems of the invention can be structured so the client can directly submit and record equity swaps in database 270 from station 100 through interfaces 135 of network-based platform 130. The client may then access his swap-portfolio account for sub-allocating the equity swaps among its various client sub-accounts using the methods and systems of the invention.

The client can access his swap-portfolio account from user station 100 and sub-allocate though interfaces 135 of platform 130. Preferably, the client accesses platform 130 from a personal computer 100 by entering the appropriate network address and then entering his user identification and password at the platform's logon interface 135*a*. Once the client accesses his account through the network-based platform, the client can use the methods of the invention to allocate his swaps to one or more client sub-accounts.

For example, a mutual-fund client might have a large number of different funds among which the fund manager will sub-allocate swaps according the nature of the swap in relation to the particular fund's investment strategy, risk, etc. Since the systems and methods of the invention involve platforms based on networks, the client can sub-allocate more easily and conveniently than with prior-art methods. Further details of sub-allocation are illustrated in the Examples section below.

In another embodiment of the invention, the financier and/or the client can access network-based trading platform 150 through interfaces 137 of platform 136. This is particularly useful to the financier to electronically make the other financial transactions that are part of his swap strategy directly with a market exchange 170.

Any platform that provides an interface offering information concerning financial investment is a suitable network-based trading platform for use in the invention. Preferably, network-based trading platform 150 permits electronic transactions with a market exchange 170 and provides pricing information regarding one or more commodities, preferably, listed commodities, such as stocks, bonds, futures, options, warrants, swaps, real estate, mortgages (interest rates), currency, or precious metals.

It is also preferable that network-based trading platform 150 be accessible through the Internet. Examples of network-based trading platforms suitable for practice of the invention include platforms hosted by introducing brokers and futures clearing markets that instantaneously mediate binding, direct purchase or sale of listed commodities with a market exchange 170 through electronic trading software. As used herein, the phrase "listed commodity" means any commodity that is listed on an exchange. Examples of exchanges include, but are not limited to, the American Stock Exchange, New York Stock Exchange, Chicago Board of Exchange, Chicago Board of Trade, International Securities Exchange (options), NASDAQ Stock Market, and the New York Board of Trade.

5.1.1 Central Station

As shown in FIG. 4, central station 125 comprises central processor unit ("CPU") 210, random access memory ("RAM") 220, read only memory ("ROM") 230, clock 240, operating system 250, software of the invention 260, and data-storage device and databases 270.

Examples of processors suitable for use in the invention include, but are not limited to, those sold by SUN MICROSYSTEMS, MOTOROLA AND INTEL.

The RAM should preferably be of the error-correcting code (ECC) memory type and should be from 512 MB to 1 GB in total capacity.

The operating system should be robust and provide for security of the data in storage. Exemplary operating system include LINUX®, UNIX, Windows 2000®, or Windows NT®.

Data-storage device 270 stores information necessary to process transactions. The data-storage device should provide for re-writable data and should provide redundancy via mirroring or error correction (RAID), and it should have a fast interface to the operating system so that data can be made readily available to the network. Suitable data-storage devices include hard disks.

Software for use in the invention is well known in the art. When central station 125 is configured as a web server, conventional communications software such as Internet Information Server, for delivering web pages, and INTERNET EXPLORER, for viewing web pages, by MICROSOFT Corp. can be used. Software of the invention is readily designed by one of skill in the art or available commercially.

6. EXAMPLES 6.1 Example 1

FIGS. 5-7 are web-page screen shots illustrating use of the methods and systems of the invention to sub-allocate swap transactions via a web-based platform of the invention by way of the Internet. The financier is a financial institution and the client is a mutual fund. The client can interface with the methods and systems of the invention using web pages 135 (FIG. 3). In this example, the client mutual fund has previously setup a swap-portfolio account and entered into twenty-nine swap transactions with the financial institution.

FIG. 5 is a web page screen shot exemplifying client logon. Referring to FIG. 3, this is first interface 135*a*. In this example, the client stationed at an Internet-connected computer 100 (FIG. 3) is presented with FIG. 5 upon entering the appropriate Internet address. Boxes A and B require the client to logon to the platform of the invention 100 (FIG. 3) by entering a user identification code (login) and password. Upon acceptance of the password, the client accesses his swap-portfolio account.

The platform 100 (FIG. 3) then takes the client to FIG. 6, which is a web-page screen shot displaying the twenty-nine equity-swap transactions executed by the client, which as yet are unallocated. FIG. 6 provides an interface for the client to sub-allocate the swaps to particular client sub-accounts.

In FIG. 6, column A displays boxes corresponding to swap transactions in the client's swap-portfolio account, which the client may check to select particular swaps for sub-allocation. In FIG. 6, the client has selected to sub-allocate the first swap transaction, i.e., 750,000 shares of Royal Caribbean Cruise LTD. Column B displays the trade date or execution date, that is, the date on which the client and financier entered into the swap agreement. Typically, the execution date is the date the client submits a swap-transaction order. Column C displays whether the swap is a buy swap or a sell swap. Buy and sell swaps are more fully described in the Background section above. Column D displays the number of equities underlying the swap transaction. Column E displays the underlying equities' ticker symbol. Column F displays the equities' identity. Column G displays the share price at which the financier purchased the equities underlying the swap transactions also referred to as the settlement price. Column H displays the currency used to trade the swaps (e.g., NOK means that the Norwegian Kronen was used to purchase the equity shares and GBP means that British pounds were used to purchase the shares). Column I displays the currency used to settle the transactions.

FIG. 6 further shows (entries 1 and 2) that on Mar. 19, 2002, the client entered into a sell swap with the financier for 1,000,000 shares of Royal Caribbean Cruise LTD, i.e., 750,000 shares for $36.00/share and 250,000 for $36.15/share. The client checked the first box to sub-allocate the 750,000-share block of Royal Caribbean Cruise LTD purchased at $36.00/share. Upon clicking the "Submit" button J, the client electronically submits over the network instructions to sub-allocate Royal Caribbean shares and the network-based platform of the invention 130 (FIG. 3) takes the client to the next web page (FIG. 7) for sub-allocation.

FIG. 7 is a web-page screen shot providing an interface for the client to sub-allocate all or portions of selected swaps into the client's different sub-accounts. Column A indicates whether the swap is a buy swap or a sell swap. Column B displays the execution date. Column C displays the settlement date. Column D displays the underlying equities' ticker symbol. Column E displays the price at which the financier purchased the equities underlying the swap. Column F displays the currency used to trade the shares, and column G displays the currency used to settle the shares. Column H displays the number of shares that are sub-allocated. Column I displays the number of shares remaining unallocated after the sub-allocation. And column J indicates the percentage of equity shares remaining unallocated after the sub-allocation.

In FIG. 7, in box $K_1$, the client sub-allocates 250,000 shares (33.33%) of the 750,000-share block of Royal Caribbean Cruise LTD checked in FIG. 3 to the RA1 sub-account of the De Shaw Investment Group Portfolio LP, and, in box $K_2$, the client sub-allocates the remaining 500,000 shares (66.66%) to his RA2 sub-account. Advantageously, the methods and systems of the invention allow partitioning of shares for sub-allocation according to user preference, for example, either as a percentage or as a share number. The client then clicks "Go" button L to execute the sub-allocations.

6.2 Example 2

This Example is based on the same facts as Example 1 where the financier is a financial institution and the client is a mutual fund. As above, the client mutual fund has previously setup a swap-portfolio account and entered into twenty-nine swap transactions with the financial institution.

FIG. 8 is a web-page screen shot of a web page presented to the client by the platform after logon. FIG. 8 presents the client with the twenty-nine unallocated swaps. But differing from Example 1, in which the client selected only Royal Caribbean Cruise LTD for sub-allocation (see FIG. 6)—the client has checked every box to sub-allocate all twenty-nine swaps at once. The client is then taken to the next web page, FIG. 9.

FIG. 9 is a web-page screen shot where the client, in box K, has chosen to sub-allocate seventy-five percent of each of the twenty-nine unallocated swaps checked in FIG. 8 to the De Shaw Investment Group Portfolio LP RA1. In this example, for the client's convenience, the platform has combined the swaps having the same underlying equities and purchased on the same date into single entries. For example, the platform has combined the 750,000 and 250,000 shares of Royal Caribbean Cruise LTD purchased on Mar. 19, 2002, for $36.00/share and $36.15/share respectively, into a single entry of 1,000,000 shares having an average share price of $36.0375/share.

6.3 DEFINITIONS

As used herein, the term "network" means any system of two or more interconnected computers. Examples of networks include, but are not limited to, the Internet and other Wide Area Networks (WANs), and Local Area Networks (LANs).

As used herein, the phrase "network connection" means any channel by which a person, party, or business entity can interface or communicate with a network. Examples of network connections include, but are not limited to, telephone lines by way of internal or external modems, digital subscriber lines ("DSL"), connections to voice mail and voice pages; dedicated data lines; cellular phone communication; communication by way of satellite; and cable television lines.

As used herein, the term "platform" means a system of hardware and/or software located on a network that performs a function, such as providing services or information, and which is accessible through a network interface. Examples of platforms include, but are not limited to, network-based computers, such as Internet servers; voice-mail systems; and voice-page systems.

As used herein, the term "interface" means a displayed or transmitted, user friendly set of pictures, text, voice statements, or other communication means that provide instructions and protocols indicating how a user is to communicate and interact with a platform. For example, an interface allows a user to direct computer software located on the user's computer or within a network. Examples of interfaces include, but are not limited to, web pages, e-mail transmittals, voice pages, voice mail instructions, and facsimile transmissions (fax). An interface is displayed or provided by an "interface provider", for example, a personal computer displaying a web-page interface.

As used herein, the term "automatically" means execution by computer software upon occurrence of an event or satisfaction of a condition without instruction from or intervention of a user.

As used herein, the term "commodity" means any good or service that can be purchased or sold.

As used herein, the phrase "listed commodity" means any commodity that is listed on an exchange. Examples of exchanges include, but are not limited to, the American Stock Exchange, Chicago Board of Exchange, Chicago Board of Trade, International Securities Exchange (options), NASDAQ Stock Market, and the New York Board of Trade.

As used herein, the phrase "exchange rate" means the price listed by an exchange for a listed commodity at a particular time.

6.4 CONCLUSION

In view of the above Background, Summary, Figures, and Detailed Description presented above, it is clear that in certain embodiments, the invention comprises a method for sub-allocating one or more swaps among a plurality of accounts comprising:
 (a) accessing a network-based platform comprising the plurality of accounts;
 (b) displaying the one or more swaps on an interface;
 (c) selecting at least one of the one or more swaps by way of the interface; and
 (d) sub-allocating the selected swap into one or more of the plurality of accounts by way of the interface.

In another embodiment, the invention is directed to a system for sub-allocating one or more swaps among a plurality of accounts comprising:
 (i) a memory storage device;
 (ii) a computer processor connected to the storage device;
 (iii) one or more computer software programs for controlling the computer processor; wherein the memory storage device and the processor are operative with the programs to:
  (a) access a network-based platform comprising the plurality of accounts;
  (b) display the one or more swaps on an interface;
  (c) allow a user to interact with the interface to select at least one of the one or more swaps; and
  (d) allow a user to interact with the interface to sub-allocate the selected swap into one or more of the plurality of accounts.

In still another embodiment, the invention is directed to a computer readable medium programmed with computer software that is operative to cause a system comprising a memory storage device and a processor to:
 (a) access a network-based platform comprising a plurality of accounts;
 (b) display one or more swaps on an interface;
 (c) allow a user to interact with the interface to select at least one of the one or more swaps; and
 (d) allow a user to interact with the interface to sub-allocate the selected swap into one or more of the plurality of accounts.

Although the present invention has been described in considerable detail with reference to certain preferred embodiments and versions, other versions and embodiments are possible. Therefore, the scope of the appended claims should not be limited to the description of the versions and embodiments expressly disclosed herein.

What is claimed is:

1. A computer-implemented method for sub-allocating swaps among accounts of a client, comprising:
 (a) accessing, by the client via a programmable computer, a network-based platform through an interface connected to the network-based platform, wherein the network-based platform comprises (i) a plurality of accounts of the client and (ii) a record of a plurality of swaps that have been entered into by the client and a financier, wherein the record of swaps is displayed on the interface;
 (b) selecting, by the client via the programmable computer, one or more of the plurality of swaps by way of the interface; and
 (c) sub-allocating, by the client via the programmable computer, the selected swaps into one or more of the plurality of accounts of the client by way of the interface.

2. The method of claim 1, wherein the network comprises the Internet.

3. The method of claim 1, wherein the interface is one or more web pages.

4. The method of claim 1, wherein the platform is an Internet server.

5. The method of claim 1, wherein sub-allocating the selected swaps among the plurality of accounts comprises entering a percentage of the selected swaps to be allocated.

6. The method of claim 1, wherein the plurality of swaps have been entered into by way of the interface.

7. The method of claim 1, further comprising interacting with the interface to access a network-based trading platform and executing a financial transaction by way of the network-based trading platform.

8. The method of claim 7, wherein the financial transaction is a purchase or sale of a listed commodity.

9. A system for sub-allocating swaps among accounts of a user comprising:
 (i) a memory storage device;
 (ii) a computer processor connected to the storage device;
 (iii) one or more computer software programs for controlling the computer processor; wherein the memory storage device and the processor are operative with the programs to:
  (a) allow the user to access a network-based platform through an interface connected to the network-based platform, wherein the network-based platform comprises a plurality of accounts of the user;
  (b) display a plurality of swaps that have been entered into by the user and a financier on the interface;
  (c) allow the user to interact with the interface to select one or more of the plurality of swaps; and
  (d) allow the user to interact with the interface to sub-allocate the selected swaps into one or more of the plurality of accounts of the user.

10. The system of claim 9, wherein the network comprises the Internet.

11. The system of claim 9, wherein the interface is one or more web pages.

12. The system of claim 9, wherein the platform is an Internet server.

13. The system of claim 9, wherein the accounts are mutual funds.

14. The system of claim 9, wherein the memory storage device and the processor are operative with the program such that the user may interact with the interface to sub-allocate the selected swaps into one or more of the plurality of accounts by entering a percentage of the selected swaps to be allocated.

15. The system of claim 9, wherein the memory storage device and the processor are further operative with the program such that the user may interact with the interface to enter into the plurality of swaps.

16. The system of claim 9, wherein the memory storage device and the processor are further operative with the program such that the user may interact with the interface to access a network-based trading platform and execute a financial transaction.

17. The system of claim 16, wherein the financial transaction is purchase or sale of a listed commodity.

18. A computer readable medium programmed with computer software that is operative to cause a system comprising a memory storage device and a processor to:

(a) allow a user to access a network-based platform comprising a plurality of accounts of the user through an interface connected to the network-based platform;
(b) display a plurality of swaps that have been entered into by the user and a financier on the interface;
(c) allow the user to interact with the interface to select one or more of the plurality of the swaps; and
(d) allow the user to interact with the interface to sub-allocate the selected swaps into one or more of the plurality of accounts of the user.

19. The computer-readable medium of claim 18, wherein the network comprises the Internet.

20. The computer-readable medium of claim 18, wherein the interface is one or more web pages.

21. The computer-readable medium of claim 18, wherein the platform is an Internet server.

22. The computer-readable medium of claim 18, wherein the accounts are mutual funds.

23. The computer-readable medium of claim 18, operative such that the user may interact with the interface to sub-allocate the selected swaps into one or more of the plurality of accounts by entering a percentage of the selected swaps to be allocated.

24. The computer-readable medium of claim 18, operative such that the user may interact with the interface to enter into one or more swap transactions.

25. The computer-readable medium of claim 18, further operative such that the user may interact with the interface to access a network-based trading platform and execute a financial transaction.

26. The computer-readable medium of claim 25, wherein the financial transaction is purchase or sale of a listed commodity.

* * * * *